US006396413B2

(12) United States Patent
Hines et al.

(10) Patent No.: US 6,396,413 B2
(45) Date of Patent: *May 28, 2002

(54) PERSONAL ALARM MONITOR SYSTEM

(75) Inventors: Richard Hines, Stony Brook; Edward Starling, Babylon; Fred Pulver, Northport; Robert James Pang, Ronkonkoma, all of NY (US)

(73) Assignee: Telephonics Corporation, Farmingdale, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,449

(22) Filed: Mar. 11, 1999

(51) Int. Cl.[7] .................................................. H04Q 1/39

(52) U.S. Cl. .................................................. 340/825.49

(58) Field of Search ....................... 340/825.49, 825.36, 340/825.45, 539, 572.1, 573.1, 573.4, 286.07, 10.41, 10.42; 705/32; 701/209; 235/388; 455/33.2

(56) References Cited

U.S. PATENT DOCUMENTS

| | | | | | |
|---|---|---|---|---|---|
| 3,739,329 | A | | 6/1973 | Lester | |
| 3,818,345 | A | | 6/1974 | Miya et al. | |
| 4,225,953 | A | | 9/1980 | Simon et al. | |
| 4,275,385 | A | | 6/1981 | White | |
| 4,347,501 | A | * | 8/1982 | Akerberg | 340/539 |
| 4,658,357 | A | * | 4/1987 | Carroll | 705/32 |
| 4,688,026 | A | * | 8/1987 | Scribner | 235/385 |
| 4,955,000 | A | | 9/1990 | Nastrom | |
| 4,990,892 | A | | 2/1991 | Guest et al. | |
| 4,998,095 | A | | 3/1991 | Shields | |
| 5,390,339 | A | * | 2/1995 | Bruckert | 355/33.2 |
| 5,426,425 | A | | 6/1995 | Conrad et al. | |
| 5,806,017 | A | * | 9/1998 | Hancock | 701/209 |

* cited by examiner

*Primary Examiner*—Edwin C. Holloway, III
(74) *Attorney, Agent, or Firm*—Schweitzer Cornman Gross & Bondell LLP

(57) ABSTRACT

A personal alarm monitor system provides for the recording of a record of locations of a person as the person travels through a designated premises having a series of designated areas interconnected by portals or gateways, such as doorways. The person carries a receiver capable of receiving broadcasts from a series of preferably low-power transmitters specifically located throughout the premises. Pairs of transmitters are located at each gateway, one transmitter being placed in each of the adjacent designated areas to broadcast a signal primarily into the designated area about the gateway. Additional unpaired transmitters may be located at additional locations in the designated areas. Each transmitter is assigned and broadcasts a unique code corresponding to its location and status as either a gateway or non-gateway tag. A portable receiver, carried by a person whose location is to be monitored, receives the unique code broadcasts from the transmitters and processes the code data to validate the position it represents. When validated, the code is stored by the receiver. A list of the validated codes can be downloaded or transmitted to a remote location for tracking purposes.

19 Claims, 5 Drawing Sheets

PERSONAL ALARM MONITOR SYSTEM

The present invention pertains to a new and improved method and apparatus for determining the location of an individual within a specified area. More particularly, this invention relates to an apparatus which comprises the combination of a portable device which, in conjunction with a series of fixed transmitters, provides information which may be processed by a monitoring station to determine the location of a user carrying the portable device.

BACKGROUND OF THE INVENTION

There are numerous workplace situations where it is advantageous or essential for individuals to have a means of communicating to a monitoring station that they are in an emergency situation and simultaneously allowing their location to be determined. For example, in a correctional facility an officer may be unable to verbally communicate his location during an emergency. In addition, there are situations when it may be desirable to transmit one's location in a silent, non-obtrusive manner, either as a means of reporting a particular event or situation, or merely to allow a surveillance office to be apprised of the user's location.

There are two general types of personal alarm monitoring (PAM) systems for monitoring the location of a person. In a passive PAM system, a user simply follows a pre-arranged schedule. The monitoring station assumes the location of the user based upon the schedule. However, if a user travels to a location other than his assigned location, or alters the schedule, the user's location is unknown and cannot be determined by the monitoring station.

In contrast, active PAM systems determine the location of the user when requested or required through a communication system with the user. Although there are numerous active PAM systems utilizing a variety of technologies, including infrared, ultrasonic, and radio frequency systems, such conventional systems are often unable to reliably determine the location of a user. Radio frequency schemes can report wrong locations due to the inability of such systems to properly account for attenuation or multiple reflections or receptions of the radio frequency signals. Infrared and ultrasonic locating systems are often ineffective due to interference problems caused by smoke or noise, and may suffer from directionality limitations. Such installations are also usually expensive, since the sensors or receivers are typically hand-wired to the monitoring station.

It is thus an object of the present invention to provide an improved system for monitoring the location of an individual in a building or other defined area.

It is a further object of the present invention to provide a method and apparatus for determining the location of an individual with precision and accuracy.

Another object of the present invention is to provide a system which is simple and inexpensive to install and operate, and which can function in a defined area having hallways, rooms and open areas.

It is yet another object of the present invention to provide a system which allows for economical expansion of the range of coverage and/which exhibits improved precision over conventional systems.

Still a further object of the present invention is to provide a method and apparatus for location determination which utilizes a series of fixed transmitters located throughout the area to be monitored and portable transceivers which are carried by the individuals whose whereabouts are to be monitored.

SUMMARY OF THE INVENTION

A personal alarm monitor system in accordance with the present invention utilizes radio frequency identification (RFID) tag transmitters positioned throughout a building or other specified area or premises; one or more portable personal alarm monitor transceivers or "body units"; and a monitoring station. A body unit is carried by a user whose location is desired to be monitored. The RFID tags are installed throughout the premises at fixed locations; each is provided with a unique identification code. The identification codes and corresponding locations for the RFID tag units are known by the monitoring station.

The RFID tags broadcast low-level identification radio signals, preferably on an intermittent basis. Each body unit is capable of receiving the signals from all RFID tags. As a body unit wearer travels through the premises, the body unit receives identification data from each RFID tag it passes. The identification data is stored by the body unit. The most-recently received data is indicative of the current location of the body unit and its wearer. The collection of identification data stored by the body unit provides a history of the wearer's path of travel. The stored identification data can be downloaded or transmitted by the body unit to the monitoring station to provide location information to supervisory personnel.

The RFID tags are located throughout the premises as appropriate to provide useful location data. Even though the tags are low-power devices, and may include antenna structures to direct the broadcasts in particular directions, there exists the possibility that a body unit will receive identification data from RFID tags which are not directly along the wearer's path of travel. Accordingly, the invention embodies logic, enabled by a microprocessor in the body unit, to process the signals received by the body unit, the logic allowing rejection of signals from RFID tags which would not logically correspond to a path of travel dictated and permitted by the geometry and layout of the premises. The logic also allows compensation to be made for defective or inoperative RFID tags. Only when a received identification signal is verified is it passed to a list which serves as the travel history for the body unit and its wearer and can be transmitted to the monitoring station for use in determining the current location of the body unit/user as well as its path of travel.

The positioning of RFID tags, and the identification scheme associated therewith, interfaces with the processing logic. In a particular embodiment of the invention, the placement of RFID tags include the placement of paired tags at portals or gateways, such as doorways, linking defined designated areas of the premises to be monitored. The identification data associated with each such gateway RFID tag identifies it as a gateway tag and allows its complementary tag to be identified, as well as identifying its location in the monitored premises.

The identification data transmitted by a gateway tag allows a body unit receiving the data to identify its linked complement gateway tag; the processing logic recognizes that sequential reception of signals from both linked tags is required for a valid passage through the referenced gateway or portal between defined areas. Similarly, as all RFID tags in an defined area are logically linked through their identification codes, body unit processing logic can reject a received RFID tag broadcast if it corresponds to a location in an area which has not been previously entered by a previously recorded passage through a gateway as reflected by previous receipt of identification data from the associated pair of gateway tags.

BRIEF DESCRIPTION OF THE DRAWINGS

A fuller understanding of the present invention will be achieved upon review of the following detailed description of a preferred, but nonetheless illustrative embodiment of the invention when considered in conjunction with the annexed drawings, wherein.

DETAILED DESCRIPTION OF THE INVENTION

Figure 1:
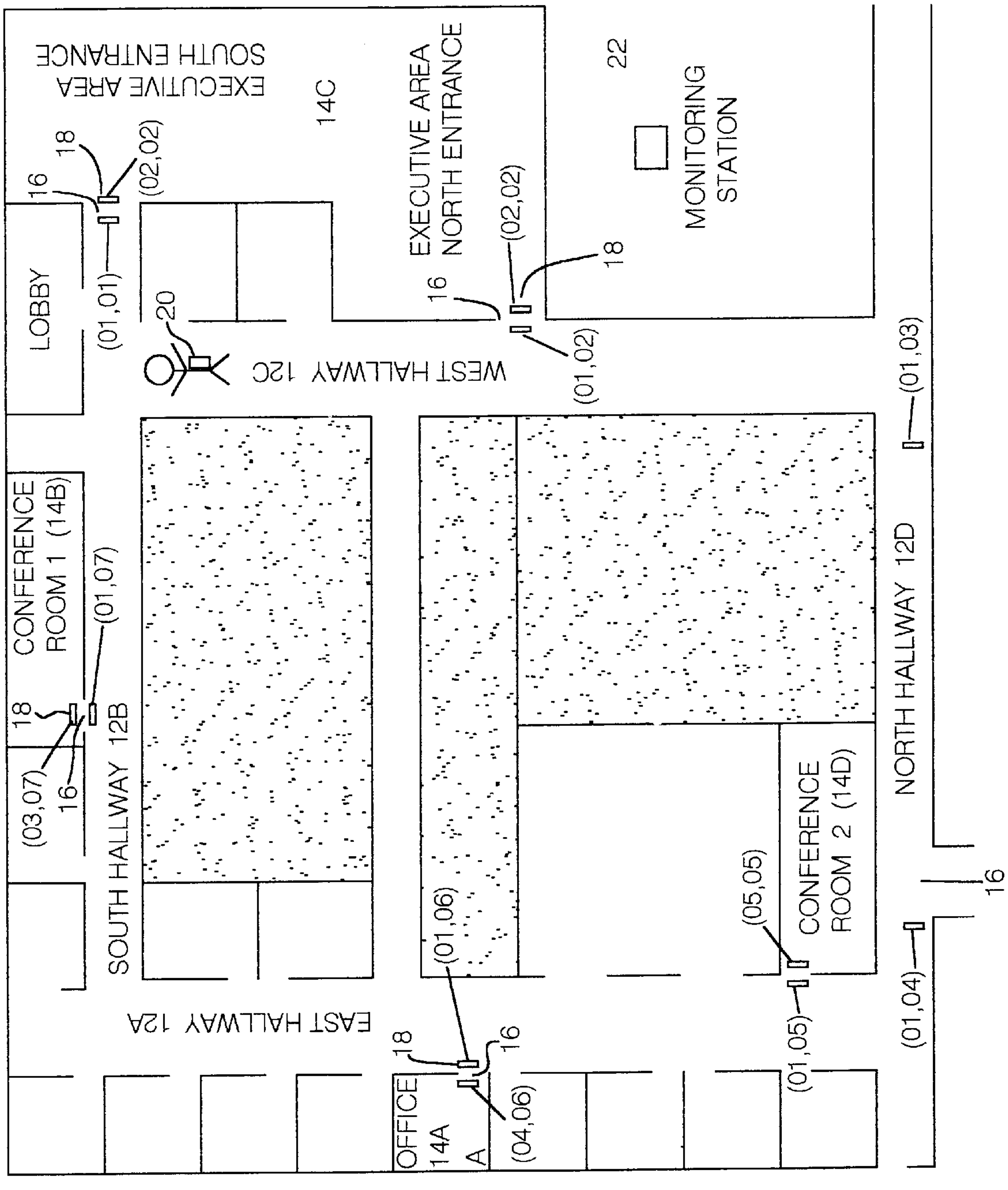
FIG. 1 is a schematic representation of an area in which the location of individuals carrying body units can be monitored, depicting an illustrative positioning of RFID tags therein.

With initial reference to FIG. 1, the present invention incorporates the use of portable transceiver body units 20 which are carried by personnel and which receive signals generated by low-power RFID transmitters 18, situated throughout an environment or premises of defined boundaries in which the travel and location of the personnel is sought to be monitored. As depicted in FIG. 1, the premises is represented by a portion 10 of a building having a series of hallways 12*a-d* and a series of offices and other rooms 14*a, b, c* . . . . The hallways and the other designated area are interconnected by gateways 16, such as doorways, one of which must be traversed to pass from one designated area to another. The designated areas need not be on a single level. Stairways, which themselves can be designated areas, can link different floors of the premises, each floor forming one or more designated areas.

The RFID tags 18 are placed at particular locations throughout the premises to be monitored to permit distinct location resolution. A unique identification assigned to each RFID tag, in addition to providing location information, provides data to the body unit which allows RFID tag discrimination and signal validation to be performed. As shown in the figure, pairs of RFID tags 18, denominated as gateway tags, are located at opposite sides of each of the gateways 16 between designated areas. In addition, single, unpaired RFID tag units are located as desired within the designated areas, to further provide location reference. The specific locations of the single RFID units are chosen with consideration of the degree of position resolution desired. The overall operation of the system, however, is intended to provide general position information rather than pinpoint coordinates. Each defined area will have at least one gateway tag.

Each of the RFID tags 18 broadcasts, preferably at intervals, a unique identification code which identifies the location of the RFID tag. The identification codes follow a unique format, to be described infra, which provides for error handling and processing to minimize inaccuracies due to the potential reception by a body unit of signals from RFID tags throughout the premises. A body unit 20 receives the transmitted identification data, processes it to determine its validity, and stores the thus validated identification code, along with a time stamp, in memory. The collection of such data forms a historical record for the body unit and its wearer, and provides a record of the proximity of the individual to RFID tags and thus a finite history of the travel of the body unit and its wearer throughout the monitored premises. Because the locations of the RFID tags are known and fixed, the identity of the most recently encountered or current RFID tag may be used to determine the current location of the individual within the monitored premises.

A wireless link is established between a central monitoring station 22, which may be remote from the monitored premises and the body units, allowing the data stored by a body unit to be processed by the central monitoring station to provide location data as needed or required. The transmission to the central monitoring station can be on command of the body unit or can be on a preset basis, controlled by the body unit microprocessor. The body unit can also be polled by the monitoring station via the wireless link.

Figure 2:
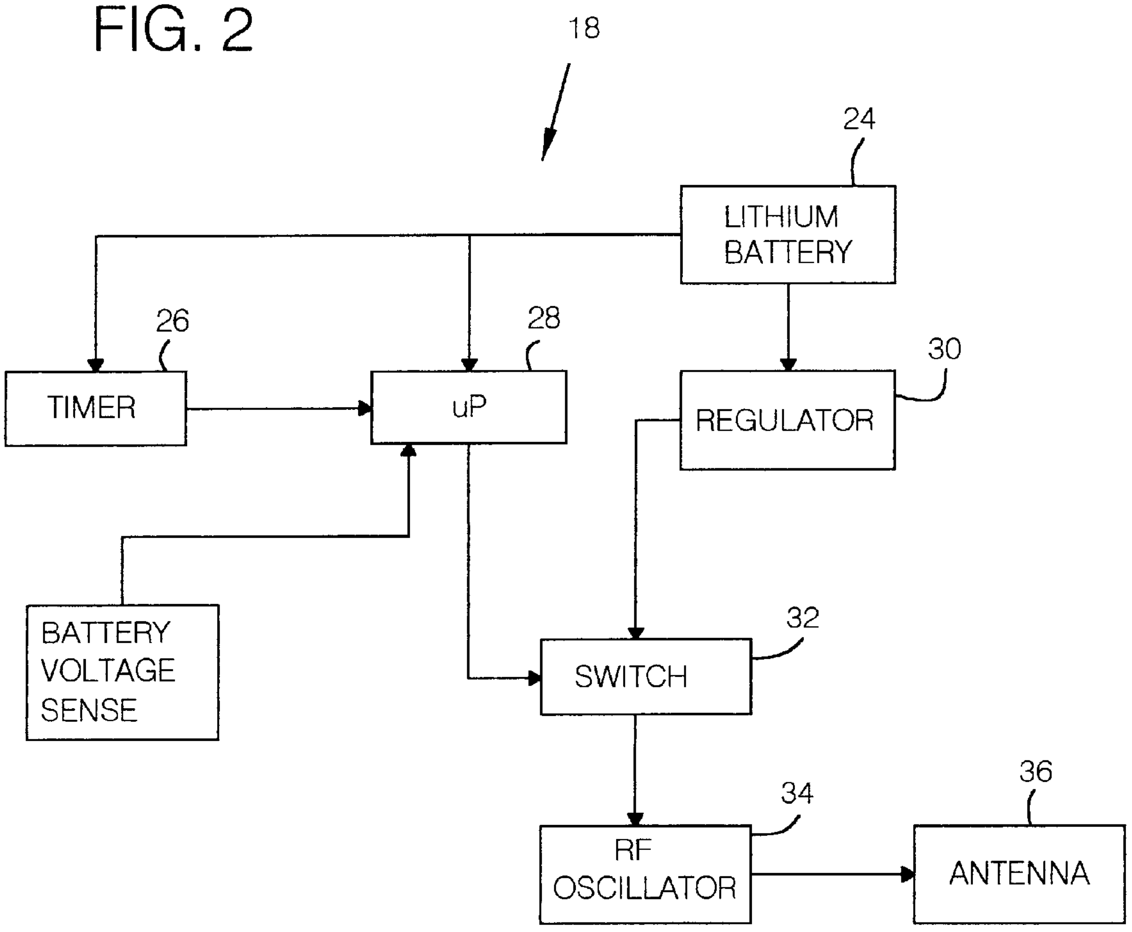
FIG. 2 is a block diagram of the components of an RFID tag.

FIG. 2 depicts the circuitry for the RFID tags 18. As depicted therein, a lithium battery 24 provides power for the tag. Timer 26 activates microprocessor 28 on intervals determined by the specific system architecture utilized. Preferably, the architecture is chosen to minimize collisions with the broadcasts of other RFID tags. One such architecture comprises a transmission time of 20 msec at an interval of between 300 and 700 msec, each RFID tag being assigned a fixed interval within that window. Alternatively, random or pseudo random broadcast intervals may be designated.

When activated, microprocessor 28 enables switch 32 which feeds regulated power from regulator 30 to the power node of RF oscillator 34. The oscillator then outputs an on-off keyed modulated RF carrier data packet to antenna 36. The frequency of operation may be within the 2.4 GHz ISM band. Preferably, the circuitry may be developed on a printed circuit board consistent with known design techniques for the frequency range employed. The data packet includes the identification of the RFID as well as monitor/health bits.

The tags transmit their identifications at low power. When a person wearing a body unit is within range of the tag, the identification number of the tag is received by the body unit and processed. The combination of low power and antenna design and orientation, as known in the art, is intended to limit the broadcast range of the tag to body unit receivers in close proximity thereto.

Figure 3:
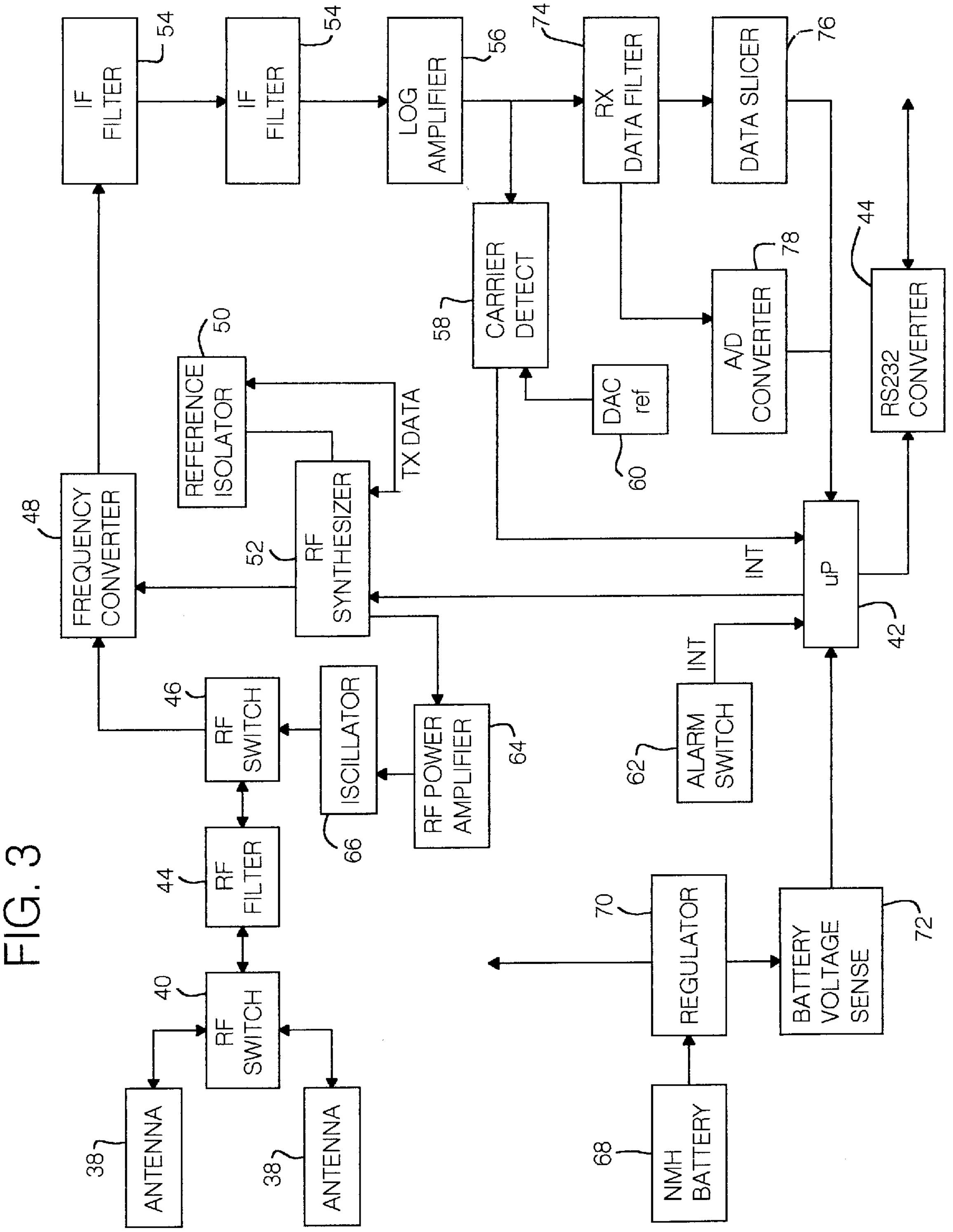
FIG. 3 is a block diagram of the components of a body unit.

FIG. 3 depicts the layout of a body unit 20, which both receives RFID unit transmissions and transmits position data to the remote monitoring station. Antennas 38 receive the incoming signals transmitted by the RFID tags and transmit the outgoing signals to the monitoring station. First RF switch 40, controlled by microprocessor 42, couples the antenna having the greater incoming signal strength to RF filter 44 and subsequent receiver system components. Second RF switch 46 couples the incoming signal from RF filter 44 to receiver circuitry or, when the transmission mode is enabled, couples the transmitter circuitry to the RF filter and antenna system in accordance with instructions generated by the microprocessor. Only one antenna is used during transmission.

During reception, second RF GLOBAL CHANGE switch 46 couples the incoming signal to frequency convertor 48, which down converts the signal to an intermediate frequency (IF) of 27 MHz. Reference oscillator 50 and RF synthesizer 52 provide the local frequency signal for the downconversion process. Once downconverted, the received signal is filtered by IF filters 54 and amplified by detecting logarithmic amplifier stage 56. The output of the amplifier is filtered and buffered at 74 and simultaneously peak detected at 58. The peak reading is compared to a threshold reference generated by a digital-to-analog convertor 60 which is under the control of microprocessor 42. The sensitivity of the system to received signals is selectable by the setting of the reference, typically within a range of −20 dBm to −85 dBm into the antenna. If the sensitivity threshold of the receiver is exceeded, an interrupt is sent to microprocessor 42. An algorithm is then executed which reads the received RFID tag data and further processes the information, as will be discussed infra.

The buffered data signal generated by data filter 74 is used to determine the signal strength of the received broadcast and control first rf switch 40. In addition, analog-to-digital convertor 78 reads the signal and provides a digital data signal, corresponding to the identification of the tag broadcasting the signal, to microprocessor 42. A percentage of the peak reading level determined at 58 is also used as a reference to slice the received data signal into sequential data bit intervals at 76 and provide logic level information to the microprocessor for processing in conjunction with the conversion of the data signal at 78. If a data packet is determined to be corrupt, or the data packet ends, the peak value is dumped and the receiver becomes immediately available to receive another packet.

In the transmit mode, activation of alarm switch 62 delivers an interrupt to the microprocessor which triggers entry into the transmit mode. RF synthesizer 52 is used to generate a frequency shift-keyed signal burst bearing the data to be transmitted, which signal is amplified at 64, buffered by isolator 66 and forwarded to second rf switch 46. The switch delivers the signal to the antennas 38. The transmission may typically include an identification of the body unit as well as position data. The microprocessor can also be programmed to enter the transmit mode on a scheduled basis.

As known in the art microprocessor 42 includes memory registers and firmware/software which allows it to supervise and control data reception and transmissions well as process the data as required.

The body unit may be powered by a 6-volt rechargeable nickel-metal hydride battery 68, regulated at 70 for the receive path circuitry and unregulated for the transmit path. Voltage sensor 72 verifies the charge state of the battery and passes such information to microprocessor 42. An RS-232 port 44 may be used to up-load program memory for the microprocessor and can allow monitor and control functions in a test mode. It may also be used to communicate with an optional GPS unit.

Although the RFID tags are low-power devices intended to broadcast a signal for reception only in the direct proximity of the tag, all RFID tags broadcast on a common frequency, and a body unit is capable of reception of signals from all RFID tags whose signals reach the body unit. Accordingly, the present invention is configured to discriminate between and among RFID broadcast signals such that an accurate record can be formed of the location of the body unit wearer.

The identification associated with each RFID tag comprises two data element portions, the combination of which uniquely identifies the tag. The first portion identifies the designated area in which the tag is located. With reference to FIG. 1, the designated areas would be the hallway 12, conference room 1, executive area, office A, or the like. Each designated area is assigned a different identifier. The second portion of the identification distinguishes the tag from the other tags located in the same designated area and associates the tag, if it is a gateway tag, with the corresponding paired gateway tag in the adjacent designated area.

For example, and with continued reference to FIG. 1, the identifications associated with RFID tags located in the hallway system are assigned the first data or group element 01. The first data element for RFID tags located in the executive area is 02, while the first data element for conference room one is 03 and for conference room two is 05. Within a designated area, the second data elements may be assigned consecutively, with the additional requirement that corresponding gateway tags, each of which has a different designated area number, have the identical second data element. Thus, since the RFID gateway tag in the hall at the entrance to conference room one is identified by second element 07, the full identification of the hall RFID being 01,07, the corresponding conference room RFID gateway tag is 03,07. In a like manner, since the hall gateway tag at the south entrance to the executive area is designated 01,01, the corresponding executive area gateway tag is 02,01. The north entrance to the executive area from the hallway is hall location 02, yielding the tag ID's for the paired gateways tags as 01,02 for the hall tag and 02,02 for the executive area tag. The paired gateway tags at the entranceway to conference room two are similarly designated by the respective identifiers 01,05 and 05,05. Additional intermediate locations in the hallway are designated as locations 03 and 04. Thus, the identification for such ID tags are 01,03, and 01,04. Because the locations of both gateway tags of a pair must be traversed when passage between designated areas occurs, and the RFID tags of each designated area are distinguishable from those in all other areas, the receipt (or non-receipt) of gateway tag data facilitate error correction and failure detection logic, allowing the system to discriminate among signals which emanate from RFID tags logically within a path of travel and those which emanate from other tags and to apply error correction and compensation as required.

Figure 4:
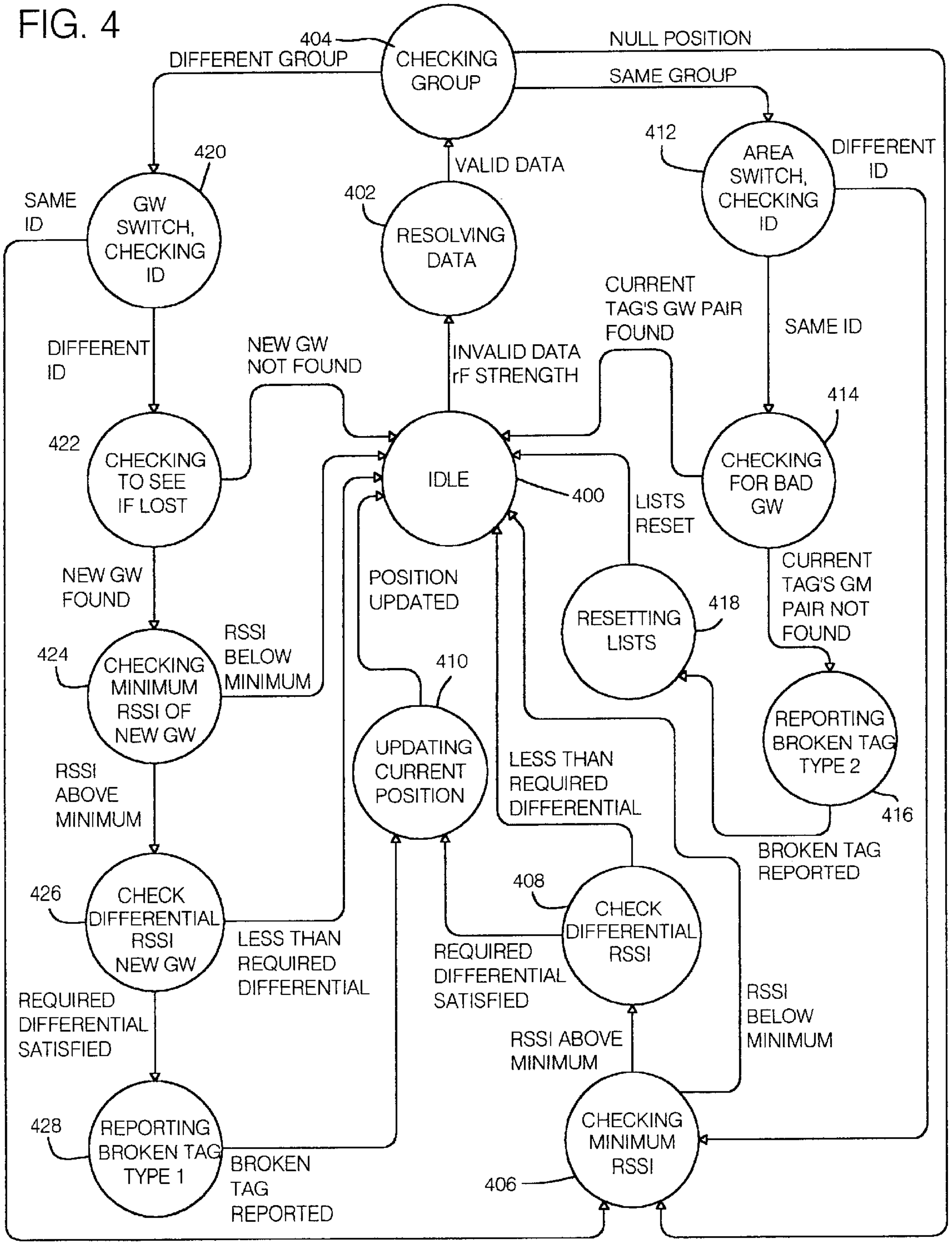
FIG. 4 is a flow diagram depicting the processing of RFID tag data by a body unit.

FIG. 4 sets forth the processing of RFID tag data as received by a body unit and implemented by the body tag microprocessor. As depicted therein, upon start-up a body unit initially enters idle state 400. Memory registers are cleared and the body unit awaits the receipt of a data packet from an RFID tag. This occurs at 402. The format of the received data is checked to confirm that it represents the identity of an RFID tag and is not corrupt. If not confirmed, the data packet is rejected and the idle state is re-entered, awaiting a new, valid signal.

Figure 5:
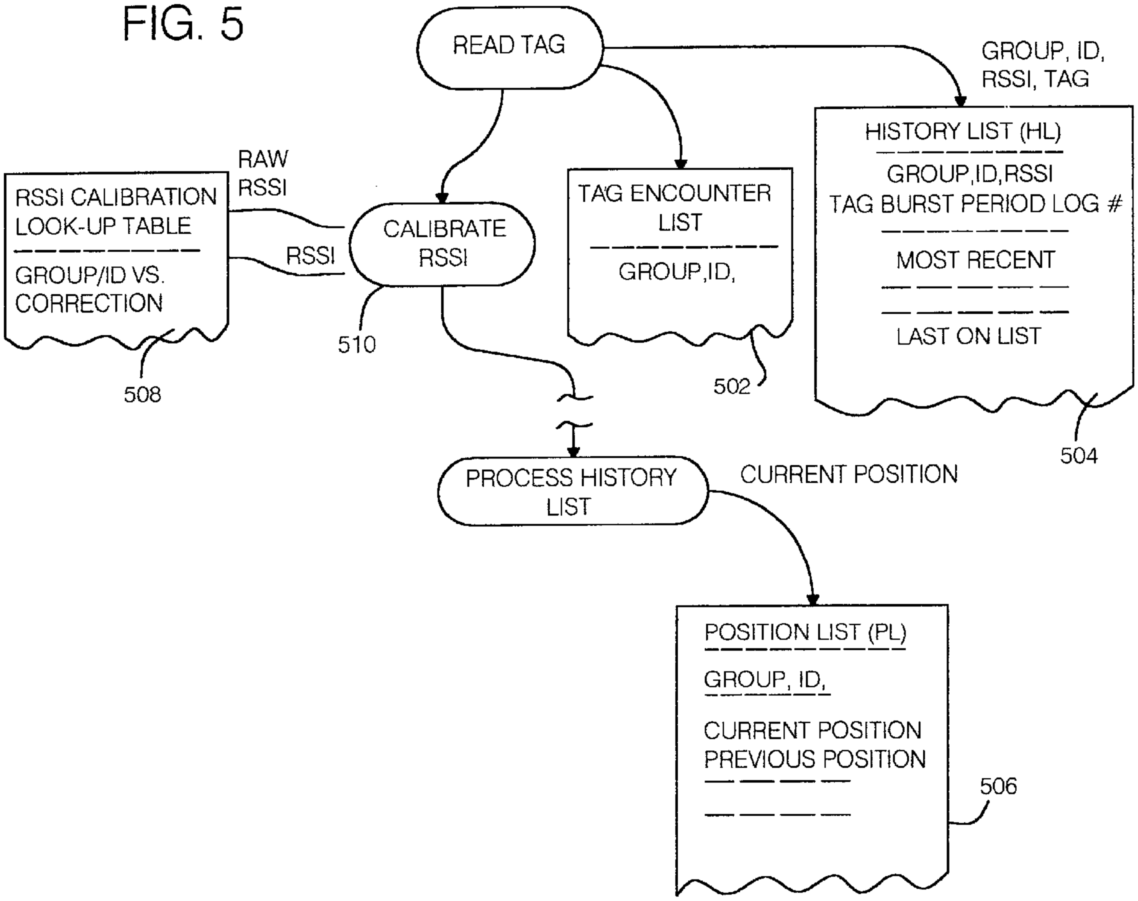
FIG. 5 is a flow diagram detailing initial processing of a valid data signal by a body unit.

When 402 is entered with the receipt of a valid RFID tag signal, initial processing of the data occurs, as further detailed in FIG. 5. Among the information stored in body unit memory are several lists, depicted in FIG. 5. Tag encounter list 502 is an ongoing record of the identification of each tag who's transmission is received and processed by the body unit. History list 504 is also an ongoing record, similar to the tag encounter list, which includes the identification of all tag transmissions received, but also includes further data associated therewith, including a timestamp. This history list is intended to be of limited, fixed size; when the capacity is reached the addition of newly encountered tag data causes the oldest tag data to be dropped from the list.

Position list 506 is a listing of the identifications of RFID tags which pass the validated process, and accordingly represents the validated positional history for the body unit. Tag data is entered into the position list only after the appropriate processing and verification of FIG. 4 is completed. It is information on this list which is transmitted as position information to the central monitoring station.

Look-up table 508 associates an adjustment value applicable to the received signal strength of a signal for each tag in the system.

If a valid RFID data packet is received the identification of the tag is placed on both the tag encounter list 502 and the history list 504. Because of potential unit-to-unit manufacturing variations, as well as variations in the field strength of the broadcast RFID signals at the position of the body units due to the particular placement of individual RFID units, the received signal must be normalized. This allows comparisons to be made between signal strengths from different RFID tags, as relative signal strength is used to determine the validity of a particular received signal. The identification of the received tag signal is utilized to identify the normalization factor to be applied; the normalization factors may be in a lookup table 508 in body unit memory, and are programmed into the table as part of initial calibration of the body unit. The normalization factors are derived from actual signal readings mode during system installation. A received signal strength indication, or "RSSI" value, representing the normalized value for the received signal, is generated by a look-up performed at 510 for the particular signal being received. The normalized value is entered in the history list 504 along with tag identification and a time stamp value. With initial processing performed substantive analysis of the received data packet information is performed as depicted generally at 120 in FIG. 5, and detailed in FIG. 4.

Referring again to FIG. 4, using the received tag identification data, the received tag group (i.e., the first or designated area data element) is compared at 404 to the group identification of the most recent (or "current") position which has been previously validated and thus placed on the position list 506. If the group is the same, it indicates that the location of the received RFID tag is in the same designated area (i.e., hall, conference room, etc.) as the current position. A different group number indicates that a potential transition between areas has occurred.

On start-up, however, there is no prior position to be compared to and thus processing follows the "null position" path; the RSSI for the received signal is compared to a reference minimum value at 406. This comparison is used to insure that the body unit is likely within a generally accepted distance from the RFID tag whose broadcast has been received to at least broadly validate position. If the adjusted RSSI is below the minimum, it suggests that the distance is too great; the data is discarded and the idle phase is re-entered to await the receipt of new data. Among the information in the data packet received by the body unit may be an indicator bit. The indicator bit provides independent identification of the type of RFID tag. Presence of the bit classifies the RFID tag as a gateway tag; lack of the bit classifies the tag as a non-gateway tag. The bit may be used in connection with RSSI comparisons to assign a minimum reference value for signal strength comparisons. A higher reference for gateway tags may be desired to improve reliability.

If the RSSI value exceeds the required minimum, a comparison is made at 408 between the RSSI value and the RSSI value for the most recently encountered tag as found on the history list, irrespective of whether that tag is also on the position list, as further explained infra. On start-up, no previously encountered tag exists and thus, so long as the received RSSI exceeded the required minimum, the current position for the body unit is updated at 410 to that of the RFID tag encountered by adding the identification added to the position list as the new current position.

Referring back to location 404, if after start-up, the first or group value for the received signal is the same as the group of the current location, indicating that the wearer of the body unit has changed position in the same designated area, the second portion of the tag identification is compared to the corresponding portion of the current location at 412. If the value is different, indicating a change of position within the designated area, the adjusted RSSI value is checked at 406 to determine whether it meets the required signal strength threshold. If the minimum is met, the RSSI is compared at 408 to an adjusted value for the RSSI for the last encountered tag as set forth on the history list. This comparison, at 408, further validates the position of the body unit.

Figure 6:
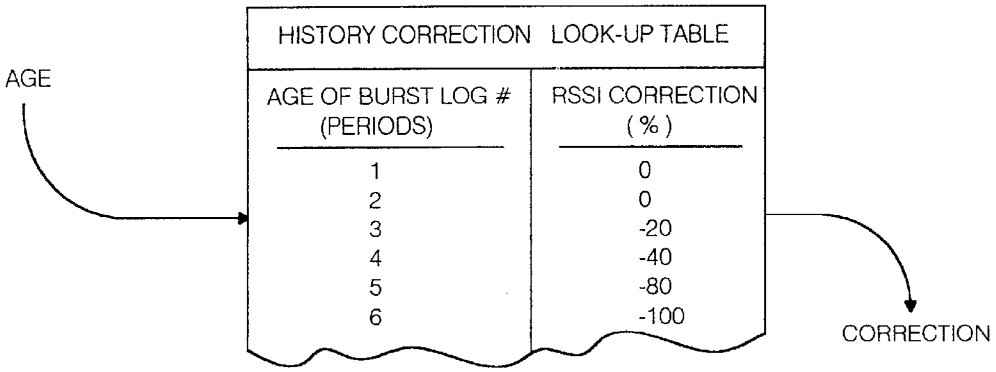
FIG. 6 is a depiction of a look-up table for received signal strength adjustment.

If the signal strength of the received data signal is greater than the signal strength of the previously encountered tag, it is assumed that the body unit is closer to the new tag than the previous tag, thus further justifying its acceptance as a new current position for the body unit. The RSSI value to which the received RSSI is compared is subject to a negative time-based weighing adjustment. The greater the time between tag data receptions, the smaller the reference value. Typically, the RSSI weighing correction is applied through a look-up table, as shown in FIG. 6. Based on the number of transmit intervals between the signal being processed and the most recent history list entry, the RSSI value of the reference is decremented accordingly. At an interval of 6 periods and beyond, the signal strength of the reference is decremented to zero.

If the RSSI of the received signal exceeds the adjusted reference value, the current position of the body unit is updated at 410 to reflect the identification received, with the new position being placed on the position list. The body unit then again enters the idle state 400 awaiting the receipt of new data. If the differential is not met, the current position is not updated, and the idle state is immediately re-entered.

In the event that the check of the identification at 412 reveals the same identification as the previously encountered tag as shown on the history list, the check is then performed for a bad gateway tag at 414. This routine provides a self-resetting feature for the body unit, preventing the malfunction of a gateway tag from defeating the subsequent recordation of validly encountered tags.

In particular, each time the same id is encountered a search is performed in the tag encounter list 502 for a gateway RFID tag pair associated with the identified designated area of the received tag data. As gateway tags have different first or group identification portions but the same second identification portion, such a search can be readily performed. If a pair of tags is found it suggests that both gateway tags are operating, and that the body unit has not crossed through the gateway (and passed into a new designated area) and returned undetected, and accordingly that the received position is properly the same as the previous position. The idle stage is thus re-entered and a subsequent signal awaited.

In the event that both tags of a gateway pair are not found, an assumption is made that at least one of the gateway tags is not operating properly and thus that there has been unrecorded gateway transits. In such a case, the tag encounter list and history list are zeroed out at 418 beyond the received RFID tag data and an independent notation is made in an appropriate storage register. Such information, when downloaded at a later time, can allow supervisory personnel to check the gateway tags associated with the event. The position list is not zeroed; it continues to be maintained and incremented as appropriate. With the lists re-set, the idle stage is entered for receipt of the next data packet. The notation of a potential gateway tag and re-set of the lists does not affect the body unit's ability to subsequently receive data from the so-noted tag. It merely serves as an internal correction procedure allowing the continuing operation of system logic.

When the inspection of the received data from an RFID tag at 404 indicates a different designated area from that of the body unit's current position as shown on the position list, the logic branches to 420. The receipt of a different first data element value indicates that a gateway should have been traversed. Accordingly, the second identification portion of the received tag data is compared to the identification of the previously encountered tag on the history list. If the id's are the same, it indicates that the two tags are gateway tags (as only corresponding gateway tags have different first values and the same second id values) and that a valid gateway traverse has occurred. The minimum RSSI value of the received signal is checked at 406, compared to the time-adjusted value for the previously encountered tag at 408 and, if signal strength is validated, the current position for the body unit is updated at 410 and the current position added to the position list.

If, on the other hand, a different identification is received, indicating that the encountered RFID tag and the previously received tags are not gateway compliments, a determination is made to see whether or not the body unit is "lost". That is, that for some reason it has not received appropriate signals which correspond to a logical path of travel, further indicating that one or more RFID tags are not operating properly. If received data is from a non-gateway tag the area's gateway tag may be inoperable; if the received data is from a gateway tag its complement may not be functioning.

The determination commences at 422. A first check is made to determine whether or not the tag from which information is being received is a gateway tag. The gateway identification bit of the received data is checked; if the check confirms the identity of the received signal as being from a gateway tag a search is performed of the history list for the compliment of the tag. The failure of either condition to be met causes the transmission to be discarded and the idle condition at 400 is reentered. Assuming that the received signal was in fact from the closest RFID tag and a gateway transition into the designated area of that tag was made without sensing the appropriate gateway RFID tag, the processing of received data signals will continue to cycle through steps 400, 402, 404, 420, 422 and 400 until a gateway tag signal is encountered or the user leaves the designated area. The received tag data is continuously entered into the encounter and history lists, however.

If the reception is identified as a valid gateway tag transmission the RSSI of its received signal is compared to the required minimum at 424. Once again, if the signal strength is below the minimum the signal is discarded and the idle state is re-entered. If the received signal strength is above the required minimum the signal strength is compared to the time adjusted RSSI of its found compliment on the history list. If the difference is less than the required differential the idle phase is entered; if the required differential is satisfied the determination is made that there is a possibility of a non-operable RFID tag, and particularly the received gateway tag's complement. The identification of the encountered tag is marked as the fault location, to be transmitted or otherwise downloaded at the central station as appropriate. While the identified location is not, strictly speaking, the actual location of the fault, it provides an indication of the general location of the fault. Investigation and maintenance of the tags can then be performed to identify the problem. Again, the identification of a potential fault location does not affect the receiver's ability to receive and process subsequent data from RFID tags in the fault area.

An example will further illustrate the operation of the invention. With reference to FIG. 1, assume that the wearer of body unit 20 activates the body unit while in the hallway proximate the south entrance to the executive area. Gateway tag 01,01 data is received, its data initially processed at 402 and its identification is place in the history and encounter lists 504, 502. As body unit memory is clear, the RSSI of the tag is checked at 406, and with the assumption that the minimum value is met, its identification is entered into the position list 506 at 410 and a new signal is awaited.

As the user enters the executive area, the body unit receives a signal from gateway tag 02,01, and its data is processed. As the first or group value (02) is different from the current group (01) the second or id values are compared at 420. As they are the same (01) the RSSI of the received signal and the differential RSSI are checked at 406, 408. The body unit's current position is then updated at 4100 as the body unit's current position.

Assume that, while in the executive area, the body unit receives a signal from gateway tag 03,07 in the conference room. After initial processing it is determined that the group of the received signal (03) is different from the current group 02, and the id value for the new signal is checked at 420. As the id is different (07 v 01) the "lost body unit" routine of 424 is entered. While the received tag data is from a gateway tag, its complement does not appear on the history list. Thus the signal is discarded and idle is reentered.

The body unit wearer exits the executive area through the north entrance. As he approaches, the body unit receives a transmission from gateway tag 02,02. As the group of the received data is the same as that of the body unit's current position and the id is different the RSSI is validated and the body unit's position is updated.

Assume next that the user has returned to the hall and that the signal from the complementary gateway tag 01,02 has been read and the body unit's position updated. As the wearer heads towards the north hall, the body unit again receives data from gateway tag 01,02. As the second or id value is the same as that of the current position (at 412) a gateway tag check is performed at 414. The history list is checked for the received tag's complement (02,02) and since it appears, the reception can be discarded and idle reentered.

Because each of the RFID transmitters broadcasts its identification data on short intervals as compared to the speed at which the movement of body units is expected, and the processing time of received by a body unit fast as a result of microprocessor speed, the system is able to both update position data and overcome the effects of signal overlap in a manner which significantly improves the accuracy and reliability of position information generated. Those skilled in the art will appreciate that modifications and adaptations of the invention beyond the illustrative embodiment set forth herein may be achieved without departing from the intended scope of the invention as claimed.

We claim:

1. Apparatus for monitoring the location of a person within a monitored premises having a plurality of designated areas interconnected by gateways, comprising:

a plurality of radio frequency transmitters located throughout said monitored premises, at least one of said transmitters being located in each designated area, each of said transmitters broadcasting a signal comprising a unique code identifying the transmitter; and a portable receiver carried by the person capable of receiving the signals broadcast by each of the transmitters, said portable receiver having means for determining the code of a broadcast received, processing said code to determine its validity as representing a position within the monitored premises in close proximity to the person, and storing a validated code as a record of the location of the person at the time of the reception thereof, said processing means comprising means for comparing the code received to a list of previously received and stored codes corresponding to a record of previous other locations for the person and determining whether the received code corresponds to a valid location for the person based upon a logical relationship between the position associated with the received code and the record of previous other locations.

2. The apparatus of claim 1, wherein each transmitter is configured to broadcast a signal intended to be received by a receiver only in close proximity to the transmitter.

3. The apparatus of claim 2, wherein each gateway has a transmitter associated therewith located proximate the gateway in each of the designated areas joined by the gateway.

4. The apparatus of claim 3, wherein the unique code associated with each transmitter includes a first data portion indicating the designated area in which the transmitter is located and a second data portion indicating the location of the transmitter within the designated area.

5. The apparatus of claim 4, wherein the second data portions associated with the transmitters associated with a gateway are the same.

6. The apparatus of claim 2, wherein said portable receiver includes a transmitter for transmitting the stored codes for reception at a remote location.

7. The apparatus of claim 6, wherein said receiver includes means for activating the receiver's transmitter upon command from the person carrying the receiver.

8. The apparatus of claim 6, wherein said receiver includes means for activating the receiver's transmitter upon command from the remote location.

9. The apparatus of claim 2, wherein the receiver further includes means for measuring and normalizing the signal strength of a received signal bearing a code and storing the normalized signal strength in association with the code and a reception time stamp.

10. The apparatus of claim 9, wherein said means for comparing the code to a list of previously-received codes includes means for comparing the normalized signal strength of the broadcast received to a time-weighted normalized signal strength value of a previously-received code.

11. The apparatus of claim 2, wherein said transmitters broadcast on an intermittent basis.

12. The apparatus of claim 11, wherein said transmitters broadcast on a common frequency.

13. The apparatus of claim 1, wherein said means for storing the code as a record of the person's location includes means for storing a time stamp associated with the code.

14. A method for determining the location of a person within a monitored premises having a plurality of designated areas in which the person's presence is intended to be detected interconnected by gateways, comprising the steps of a) assigning each designated area a unique first identifier value;

b) assigning a unique second identifier value to each gateway;

c) locating a transmitter within each designated area proximate each gateway and assigning the transmitter a unique code corresponding to the unique first identifier for the designated area and to the unique second identifier for the gateway associated with the transmitter;

d) having the transmitter broadcast its unique code for reception by a receiver carried by the person;

e) processing the unique code by the receiver for validity by comparing the code received to a list of previously received codes stored by the receiver corresponding to a record of previous other locations for the person and determining whether the received code corresponds to a valid location for the person based upon the relationship between the position associated with the received code and the record of previous other locations; and f) storing the validated code in the receiver as a record of the location of the person as of the time of reception.

15. The method of claim 14, wherein said broadcasting step is performed on an intermittent basis.

16. The method of claim 14 further comprising the step of assigning a unique second identifier value to a chosen location within a designated area not associated with a gateway, locating an additional transmitter at that location and assigning the additional transmitter a unique code having as a first identifier the unique first identifier value assigned for the designated area and a second identifier corresponding to the unique second identifier for the chosen location associated with the transmitter.

17. The method of claim 14 further comprising the step of transmitting validated codes stored by the receiver to a remote location for display and correlation with the physical locations associated therewith.

18. The method of claim 17, wherein said step of transmitting validated codes occurs upon a command of the person carrying the receiver.

19. The method of claim 17, wherein said step of transmitting validated codes occurs upon a command of the remote location.

* * * * *